Patented Sept. 22, 1925.

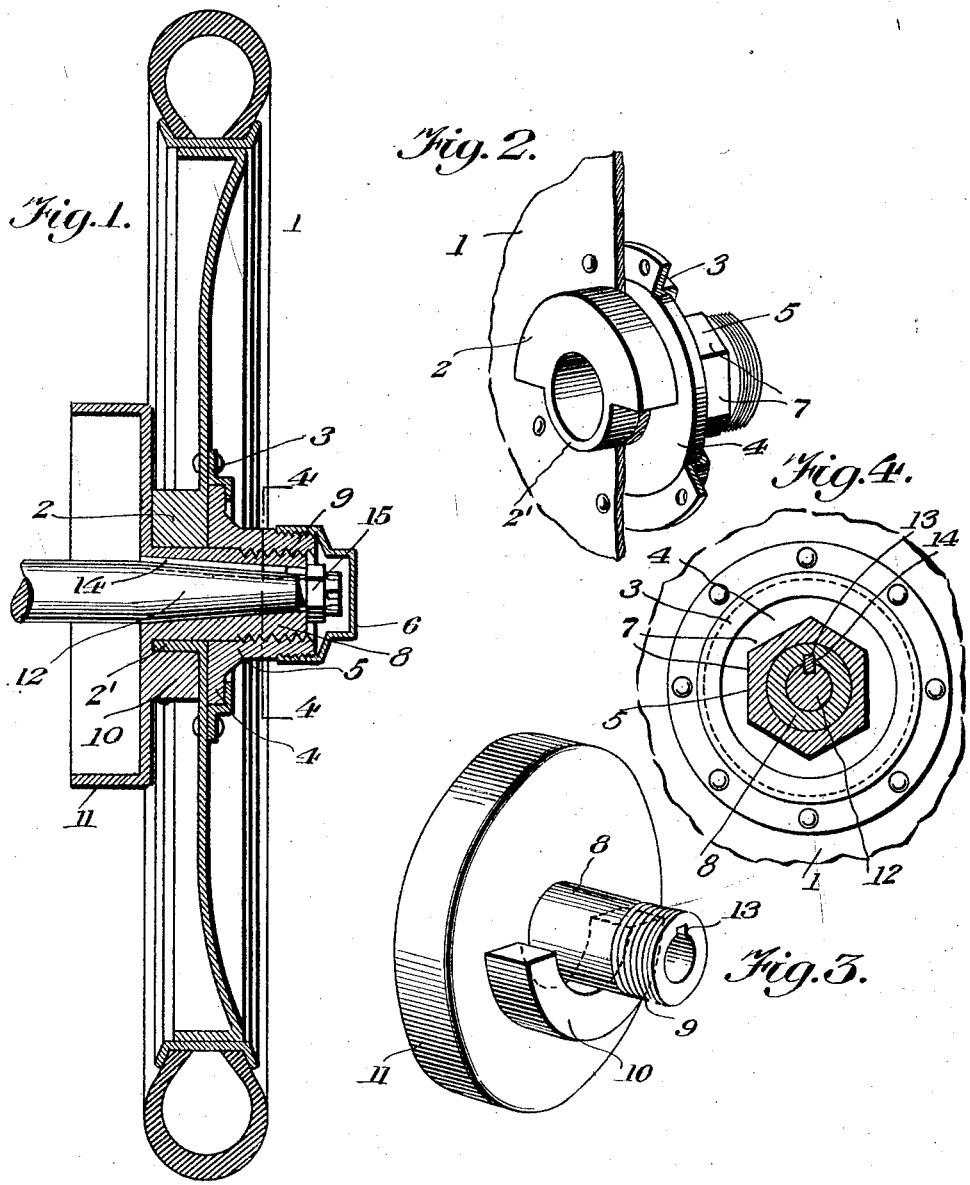

1,554,867

UNITED STATES PATENT OFFICE.

THURSTON MATHENY, OF NELSONVILLE, OHIO, ASSIGNOR OF ONE-HALF TO C. C. SHARP, OF NELSONVILLE, OHIO.

QUICK-REMOVABLE WHEEL.

Application filed August 20, 1923. Serial No. 658,401.

*To all whom it may concern:*

Be it known that I, THURSTON MATHENY, a citizen of the United States, residing at Nelsonville, in the county of Athens and State of Ohio, have invented new and useful Improvements in Quick-Removable Wheels, of which the following is a specification.

An object of this invention is the production of a vehicle wheel so constructed that the same may be easily and quickly arranged upon and secured to or removed from an axle without the employment of the numerous tools, time and labor now occasioned in such operations.

A further object is to produce a quick removable wheel that includes a hub section carrying a segment and in which the wheel axle is splined, a wheel having a disk side provided on its inner face with a segment to contact the first mentioned segment and having revoluble on its outer face a flanged nut member for threadedly engaging the hub, the turning of which in one direction secures the wheel on the axle and the turning of which in an opposite direction permitting the separation of the wheel from the axle.

With the above broadly stated objects and many others which will appear as the nature of the invention is more definitely explained, reference is to be had to the drawings which accompany and which form part of this application.

In the drawings:—

Figure 1 is an approximately central transverse sectional view through a vehicle wheel embodying the improvement.

Figure 2 is a fragmentary perspective view of a portion of the disk wheel with the segment and the revoluble nut member thereon.

Figure 3 is a perspective view of the hub element of the improvement.

Figure 4 is a sectional view approximately on the line 4—4 of Figure 1.

Referring now to the drawings in detail the numeral 1 designates broadly the disk wheel of an automobile. Either secured to or integrally formed with the disk of the wheel, at the opening thereof through which the axle passes, there is a sleeve 2'. The sleeve 2' has a thickened portion in the nature of a peripheral segmental enlargement 2.

On its outer face there is secured to the disk a flanged ring 3 that provides a guide for the inner flanged end 4 of a nut member 5. The nut member has its bore for only a portion of its length threaded and has its outer end exteriorly threaded. The last mentioned threads are engaged by the interior threads of a hub cap 6. Between the hub cap and the inner flanged portion 4 the nut member has its outer face formed with angularly disposed facets 7 for the reception of the jaws of a wrench whereby the nut member may be revolved in the flanged bearing ring 3.

The bore of the flanged nut member 5 is arranged in a line with that of the sleeve 2' and these aligning bores are designed to receive therethrough a hub 8. The hub has its outer portion threaded as at 9 for the engagement of the interior threads on the nut member 5.

Integrally formed with, but spaced from to partly surround the hub 8 there is a segment 10 whose ends are designed to abut those of the segment 2 so that the turning of the hub 8 will impart a like motion to the wheel 1.

The hub 8 has its bore of the usual conical formation for the reception of the cone-shaped end of the axle 12. The axle is provided with the usual keyway which aligns with a similar keyway 13 in the hub, and through these ways there is inserted the usual key 14 shown by the dotted lines in Figure 1 of the drawings. The outer threaded end of the axle is engaged by the usual lock nut 15.

The hub cap 6 is designed primarily to protect the nut member 5 from side wipes by other vehicles. To remove the wheel it is merely necessary to turn the hub cap to screw the same from the hub, and likewise to attach the wheel to the axle, after the latter is received in the hub, the nut member is again turned, but in a screwing direction.

It is believed that the foregoing description, when taken in connection with the drawings will fully set forth the simplicity and advantages of my construction to those skilled in the art to which this invention relates, but it is to be understood that I do not wish to be limited to the precise detailed construction herein set forth, but hold myself entitled to such changes therefrom as fairly fall within the scope of my claim.

Having described the invention, I claim:—

A detachable wheel including a brake drum having a hub extending from its outer face and a ring segment spaced from and partly surrounding the hub, a disc wheel having a sleeve on its inner face to receive the hub therethrough and to be received between the hub and the segment, and to bear on both of these parts, said sleeve having a thickened peripheral portion disposed opposite, contacting with the hub and having its ends engaging the ends of the segment and means, revolubly secured on the outer face of the wheel adapted to receive the outer end of the hub therethrough and to coengage therewith for locking the wheel on the hub.

In testimony whereof I affix my signature.

THURSTON MATHENY.